Patented Aug. 30, 1932

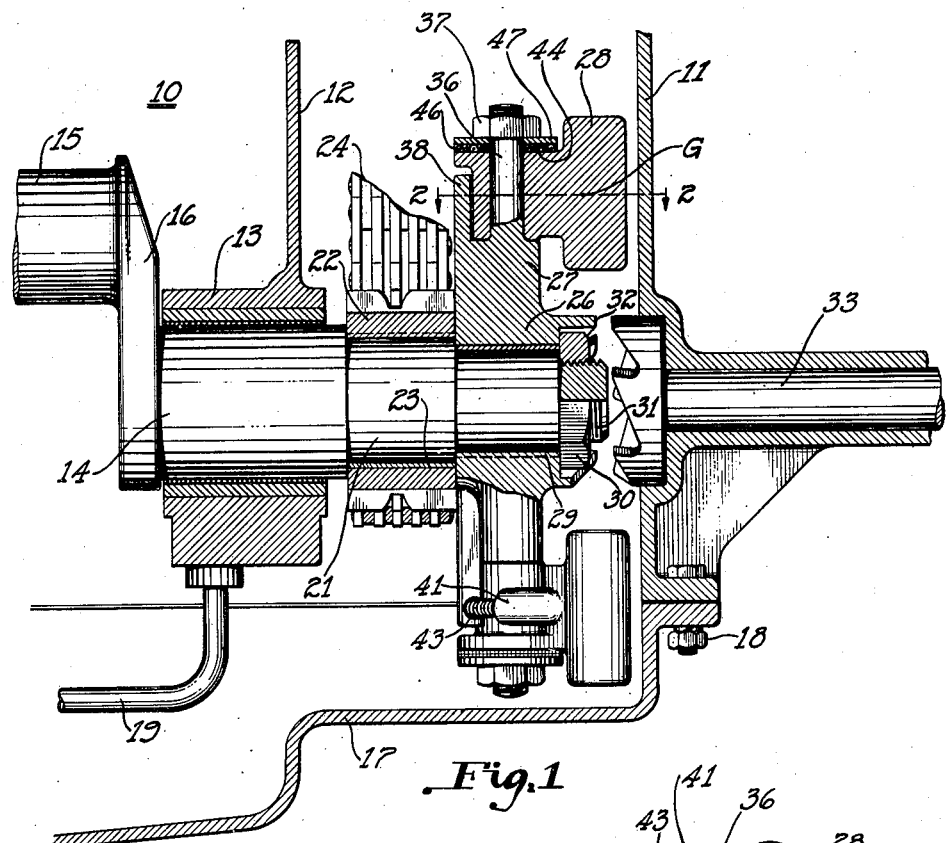

1,874,039

UNITED STATES PATENT OFFICE

WALTER R. GRISWOLD, OF DETROIT, MICHIGAN, ASSIGNOR TO PACKARD MOTOR CAR COMPANY, OF DETROIT, MICHIGAN, A CORPORATION OF MICHIGAN

INTERNAL COMBUSTION ENGINE

Application filed November 26, 1926. Serial No. 150,855.

This invention relates to internal combustion engines and particularly to means for damping torsional vibration of the crankshafts and camshafts of such engines.

One of the objects of the invention is to provide such damping means which occupies little room on the engine, but which provides a considerable damping action and which is capable of dissipating the energy of vibration in large engines of high power.

Another object of the invention is to provide means for damping torsional vibration in engines in which the damping effect shall increase proportionally to increased engine speeds.

Another object of the invention is to provide vibration damping apparatus which shall be simple and accessible, which is not expensive, and in which wearing parts may be easily renewed.

A further object of the invention is to provide a vibration damper which shall be free from sticking and jamming and which shall at all times operate freely and easily.

Other objects of the invention will appear from the following description taken in connection with the drawing, which form a part of this specification, and in which:

Fig. 1 is a vertical longitudinal section through a portion of an internal combustion engine embodying the invention;

Fig. 2 is a transverse section taken substantially on the line 2—2 of Fig. 1;

Fig. 3 is a vertical longitudinal section, partially in side elevation, through a modified form of the apparatus shown in Fig. 1, and Fig. 4 is a plan view of the device shown in Fig. 3.

Referring to the drawing, at 10 is shown a portion of an internal combustion engine having a crankcase 11 provided with transverse webs 12 in which suitable alined bearings 13 are supported. In these bearings is journaled a crankshaft 14, having crank pins 15 and crank cheeks 16, which crankshaft is adapted to be driven by the usual connecting rods from pistons located in the engine cylinders (not shown). The lower part of the crankcase is closed by an oil pan 17, removably secured thereto as by means of bolts 18, thus providing a sump for the lubricating oil of the engine. This oil is circulated to the various engine bearings in any convenient way, as by means of pipe 19, the overflow returning to the sump.

At the forward end of the engine, in front of the first bearing 13, the crankshaft is reduced in diameter as at 21, and a sprocket gear 22 is mounted thereon and connected by means of spline 23 to rotate with the shaft. This sprocket is adapted to drive a flexible chain 24 by means of which the camshaft, the generator shaft, and other auxiliaries to the engine proper (not shown) may be driven.

The damping means of this invention is illustrated as mounted at the end of the crankshaft 14 adjacent the sprocket 22, and it consists of a spider 26 having radially disposed arms 27 on which the weight or inertia members 28 are mounted. The spider is formed separately from the crankshaft but is supported on and keyed to the reduced end thereof as by a key 29 so that these parts rotate together. It is retained in its keyed relation to the shaft by a nut 30 on the threaded end 31 of the shaft, which nut may clamp the damper against the sprocket 22 or against a shoulder formed on the shaft. The end of the nut is preferably formed with clutch teeth 32 which may be engaged with similar teeth on an endwise movable starter shaft 33. This is the usual hand starter crank for manually rotating the crankshaft for starting.

The arms 27 are oppositely disposed and are provided at their ends with bearing members or pivot pins 36 on which the inertia members are journaled. These pins 36 form continuations of the respective arms, so that the axes about which the inertia members may rotate are alined, are normal to the crankshaft axis, and are oppositely disposed. One of the inertia members 28 is journaled on each of the pins 36 in such a position that its center of gravity G is removed from the axis of rotation, and the inertia members are retained on these pins by means of nuts 37 threaded to the ends thereof.

In this invention the inertia members are yieldingly urged toward a neutral position, and to this end the arms 27 have portions forming bracket members 38 which are radially disposed with respect to the crankshaft and are parallel to and adjacent the pins 36. Each of these brackets is set in close to the adjacent portion of the inertia member, which is the portion through which the bearing pin passes and which is preferably cylindrical about the pin axis. The bracket is provided with laterally disposed portions having surfaces which are inclined to the neutral plane, in which faces are formed pockets or recesses 39. The sides of the inertia members are formed with lugs 41 in which are similar recesses 42 and compression springs 43 are arranged between the corresponding recesses 39 and 42. These springs are therefore so disposed as to exert equal and opposite pressures tending to turn the inertia member on its bearing, and serve to urge the inertia member constantly toward its neutral position and to return it to such position after any angular displacement therefrom.

Each inertia member 28 is positioned axially of its bearing pin between a shoulder formed on the arm 27 at its juncture with the pin, and the nut 37. The outer face of the member 28 is adapted to co-operate with a friction member or disc 46 of any suitable material. This friction member 46 is retained on the pin by a washer 47 which is in turn secured by the nut 37, and it will be seen, therefore, that sliding motion of the inertia member on the pin, radially of the hub 26, is opposed by the nut 37 which retains all these parts in position. At the same time it will be evident that rotary movement of the weight on the pin 36 is resisted by the springs and by the friction set up between the disc 46 and the surface 44 of the weight, and that the amount of this friction is proportional to the radial pressure exerted by the inertia member on the friction disc 46. The radial pressure is exerted through the tendency of the weight to slide outwardly on the pin under the centrifugal force of rotation, and is therefore proportional to some function of the speed of the crankshaft.

The operation of the device will be readily understood. When the shaft is rotating at a uniform velocity, the weight members 28 will be carried around with the shaft on their respective pins 36 substantially in their normal position, into which position they are continually urged by the pressure of the springs 43. Upon the inception of a torsional vibration, however, an oscillatory movement of high frequency is superposed upon the uniform forward rotary movement of the shaft, which oscillations give to the shaft high accelerations which are alternately positive and negative. Because of their inertia, the weight members 28 cannot readily follow this oscillatory movement but tend to continue their unidirectional rotation about the shaft axis. Consequently an oscillatory movement of the weight members about the axes of the pins 36 occurs, which oscillation is opposed by the braking effect of the friction discs 46 on the members 28. Because of this friction energy is dissipated from the system in the form of heat, thus preventing the increase of the total vibratory energy and damping the vibration in the well known manner.

It will furthermore be understood that since the radial pressure of the members 28 against the discs 46 is principally dependent upon the speed of rotation of the shaft, the braking effort will be greater at high engine speeds where the vibratory disturbances are more severe and greater damping effect is desired.

In Fig. 3 is shown a modification of the device illustrated in Fig. 1 in which two oppositely disposed inertia members 55 and 56 are employed. These members are pivotally mounted on the pin 36, one above the other, and interposed between their adjacent faces is a friction member or disc 57. A similar pair of inertia members is disposed on the other pin (not shown) which is radially opposite to the pin 36. The members are retained upon the pin 36 by means of a washer 58 and a nut 59 which is threaded to the outer end of the pin. The members 55 and 56 are returned to their normal position, after any displacement therefrom, by means of a pair of similarly disposed springs 61 which are arranged between the adjacent faces of the members 55 and 56 on either side of the pivot pin, as clearly shown in Fig. 4. In this arrangement, by which the mass of the damping member may be largely increased without a corresponding increase in the space occupied by the damper, each of the members 56 and 57 acts as a spring abutment for the other member, so that the force of the springs 61 is exerted between them.

It will be understood that various forms of the invention other than those described above may be used without departing from the spirit or scope of the invention.

Having thus described the invention, what is claimed and desired to be secured by Letters Patent is:

1. In a vibration damper, the combination with a shaft, of oppositely disposed pins carried thereby at right angles thereto, an oscillatory inertia member journaled on each of said pins, and friction means between the pins and said inertia members.

2. In a vibration damper, the combination with a shaft, of inertia members supported on the shaft to oscillate about axes at an angle to said shaft, and friction means acting between the inertia members and the shaft to oppose oscillation of the inertia members and operable in response to axial pressure of said members.

3. In a vibration damper, the combination with a shaft, of inertia members carried thereon, to oscillate about axes at an angle to the shaft, and friction members acting between the shaft and said inertia members adapted to resist movement of the inertia members.

4. A vibration damper comprising a shaft, oppositely disposed pivot pins secured thereto normal to the shaft axis, an inertia member rotatably and slidably mounted on each pin, and means to urge each inertia member toward its neutral position.

5. A vibration damper comprising a shaft, oppositely disposed pivot pins mounted thereon, inertia members mounted on the pins having centers of gravity offset from the pin axes, friction members on the pins between the inertia members and the outer ends of said pins adapted to limit radial movement and to resist pivotal movement of the inertia members, an abutment fixed in relation to the pin, and oppositely disposed springs between the inertia member and said abutment.

6. A vibration damper comprising a shaft, pivot pins thereon normal to the shaft axis, an inertia member pivotally and slidably mounted on each pin, a member secured to each pin and engaged by the inertia member to frictionally resist pivotal movement and to resist sliding movement thereof, and means to return the inerita member to normal position after oscillatory movements thereof.

7. A vibration damper for rotary bodies having an inertia member mounted for rotation with the shaft, and for oscillation with respect thereto about an axis disposed at an angle to the axis of rotation in response to the inertia forces of non-uniform rotation, and spring means between the inertia member and said body adapted to oppose the action of the inertia forces on the member.

8. A vibration damper for a rotary shaft comprising a pivotally movable inertia member mounted on the shaft, springs acting between the inertia member and the shaft to urge the inertia member toward a neutral position with respect to the shaft against the inertia forces of rotation, and friction means operative by said inertia member proportionally to the speed of the shaft to resist said pivotal motion.

9. In a vibration damper for a rotary body, the combination with bearings carried by the body, of inertia members pivotally and slidably mounted on the bearings to oscillate thereon in response to inertia forces and to slide radially thereon in response to centrifugal forces respectively, and means acting between the inertia member and the body to frictionally limit the sliding movement and to oppose the oscillatory movement.

10. In a vibration damper for a shaft, the combination with a pin disposed normally to the axis of the shaft, of an inertia member pivotally mounted on said pin, means on the pin to limit axial movement of the inertia member thereon, and frictional means between the inertia member and said limiting means adapted to resist pivotal movements of the inertia member.

11. In a vibration damper for a shaft, the combination with inertia members mounted for rotation with the shaft and for oscillation with respect thereto about axes radially disposed to the shaft axis, of friction means operable on the inertia members proportionally to a function of the shaft speed to oppose such oscillation.

12. In a vibration damper for a shaft, the combination with inertia members mounted for rotation with the shaft and for oscillation with respect thereto about axes normal to said shaft and to move radially upon said axes under the centrifugal force of rotation, of friction means operable by the radial pressure of the inertia members in proportion to a function of the shaft speed to oppose oscillatory movements of said members.

13. A vibration damper comprising a shaft, friction means carried by said shaft, and inertia means mounted on the shaft adapted to operatively engage said friction means in response to centrifugal force of rotation, and adapted to oscillate in such operative engagement in response to inertia forces of torsional vibration.

14. A vibration damper for a shaft comprising inertia means carried by the shaft and supported for oscillation about an axis intersecting the shaft axis in response to torsional vibration, and friction means associated with the shaft and operatively contacting the inertia means to resist relative movement of said inertia means and shaft.

15. A vibration damper including a shaft, oppositely disposed pivot pins secured thereto at equal angles to the shaft axis, and an inertia member rotatably and slidably mounted on each pin.

16. A vibration damper comprising a shaft, a plurality of pivot pins mounted thereon and spaced about the shaft axis, said pins making equal angles with said axis, inertia members mounted on the pins having centers of gravity offset from the pin axis, and friction members on the pins to resist radial movement and pivotal movement of the inertia members thereon.

In testimony whereof I affix my signature.

WALTER R. GRISWOLD.